(12) United States Patent
Kumar

(10) Patent No.: US 7,886,669 B2
(45) Date of Patent: Feb. 15, 2011

(54) METHOD AND SYSTEM FOR WIND-HARNESSED BATTERY CHARGING IN A LOCOMOTIVE

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 277 days.

(21) Appl. No.: 12/126,697

(22) Filed: May 23, 2008

(65) Prior Publication Data
US 2009/0288577 A1 Nov. 26, 2009

(51) Int. Cl.
*B60K 16/00* (2006.01)
*B61C 17/04* (2006.01)
(52) U.S. Cl. ............ 105/26.05; 105/463.1; 290/44; 123/41.49; 180/2.2
(58) Field of Classification Search ............ 105/26.05, 105/36, 463.1; 320/101; 290/44; 123/41.49, 123/41.55, 41.04; 180/2.1, 2.2, 69.4
See application file for complete search history.

(56) References Cited

U.S. PATENT DOCUMENTS

| | | | | |
|---|---|---|---|---|
| 5,415,134 | A * | 5/1995 | Stewart, Jr. | 123/41.01 |
| 7,135,786 | B1 * | 11/2006 | Deets | 290/55 |
| 7,349,797 | B2 | 3/2008 | Donnelly et al. | |
| 2002/0121781 | A1 | 9/2002 | Douglas | |
| 2003/0057707 | A1 | 3/2003 | Wu | |
| 2003/0155464 | A1 | 8/2003 | Tseng | |
| 2004/0084908 | A1 | 5/2004 | Vu | |
| 2005/0046195 | A1 | 3/2005 | Kousoulis | |
| 2006/0113118 | A1 | 6/2006 | Kim | |
| 2006/0210400 | A1 | 9/2006 | Hampl | |
| 2006/0213697 | A1 | 9/2006 | Sutherland | |
| 2006/0278445 | A1 | 12/2006 | Chang | |
| 2007/0007056 | A1 * | 1/2007 | Bowers et al. | 180/65.2 |
| 2007/0013192 | A1 | 1/2007 | Berkson | |
| 2007/0107949 | A1 | 5/2007 | Bradley et al. | |
| 2007/0108775 | A1 | 5/2007 | McDavid, Jr. | |
| 2007/0262584 | A1 | 11/2007 | Lu | |
| 2007/0278795 | A1 | 12/2007 | Berkson | |
| 2008/0217922 | A1 | 9/2008 | Chiu | |
| 2008/0286102 | A1 | 11/2008 | Tomoyasu | |
| 2008/0296904 | A1 | 12/2008 | Elahi | |
| 2008/0309085 | A1 | 12/2008 | Chu | |
| 2008/0315827 | A1 | 12/2008 | Massey | |

* cited by examiner

*Primary Examiner*—S. Joseph Morano
*Assistant Examiner*—Zachary Kuhfuss
(74) *Attorney, Agent, or Firm*—Robert Wawrzyn; Alleman Hall McCoy Russell & Tuttle LLP

(57) ABSTRACT

Systems and methods are described for generating electrical energy and/or charging a system electrical energy storage device in a vehicle, such as a locomotive. The vehicle includes at least one airflow device coupled to an electric machine. In one example, the method includes, generating electrical energy at the electric machine, said machine being driven by an ambient air flow interacting with the airflow device; and delivering at least some of the harnessed energy to an electrical component of the locomotive. The harnessed energy may be delivered to an electrical load, or delivered to the system electrical energy storage device to charge the device, or combinations thereof.

21 Claims, 6 Drawing Sheets

METHOD AND SYSTEM FOR WIND-HARNESSED BATTERY CHARGING IN A LOCOMOTIVE

BACKGROUND

Locomotives have electronic components such as lights, on-board monitoring systems comprising microprocessors and display systems, and other related electronic elements. The power to operate these components is provided by a system battery that is charged by the running locomotive engine. However, many of these components continue to operate even when the locomotive is in a stand-by mode of operation, where the engine may be shutdown and the locomotive is stationary.

Accordingly, during a stand-by mode of operation, as may occur when a locomotive is parked on a siding for a long term, the engine is periodically operated until the battery is recharged, after which time the engine is shutdown. When the battery charge has dissipated, the engine is again started, and the charging procedure is repeated. Such operation enables the various electronic components to be maintained active during the entire stand-by mode of operation.

BRIEF DESCRIPTION OF THE INVENTION

Methods and systems are provided for generating electrical energy in a vehicle having at least one airflow device coupled to an electric machine. In one embodiment, the method comprises generating electrical energy at the electric machine, said electric machine being driven by an ambient airflow interacting with the airflow device; and delivering at least some of the harnessed energy to at least an electrical component of the locomotive. The electrical energy generated may be used for charging a system electrical energy storage device, such as a battery, in the vehicle. In this way, energy may be harnessed from ambient airflow through the airflow device, thereby charging the battery and reducing the number and/or duration of engine starts to maintain the battery charge. In another example, the harnessed energy (e.g., the electrical energy generated by the electric machine) may be delivered to an electrical component of the vehicle (e.g., a locomotive), such as to power an electrical load including lights, electronic controllers, etc.

In one embodiment, naturally flowing airstreams may run through the radiator fans and other component blowers of the stationary locomotive, or other vehicle, causing the blades to rotate. By harnessing the kinetic energy produced by ambient airflow through these components, with an airflow control device and the electric machine, the system battery may be slowly trickle charged. In this manner, the requisite frequency of battery charging (by the engine) may be reduced. The consequent reduction in recurrence of engine start-up and shutdown procedures, while the locomotive is in a stand-by mode of operation, may allow improvement in the engine performance (such as fuel economy, emissions, and noise) and reduced component degradation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF FIGURES

The present invention will be better understood from reading the following description of non-limiting embodiments, with reference to the attached drawings, wherein below:

DETAILED DESCRIPTION

Figure 1:
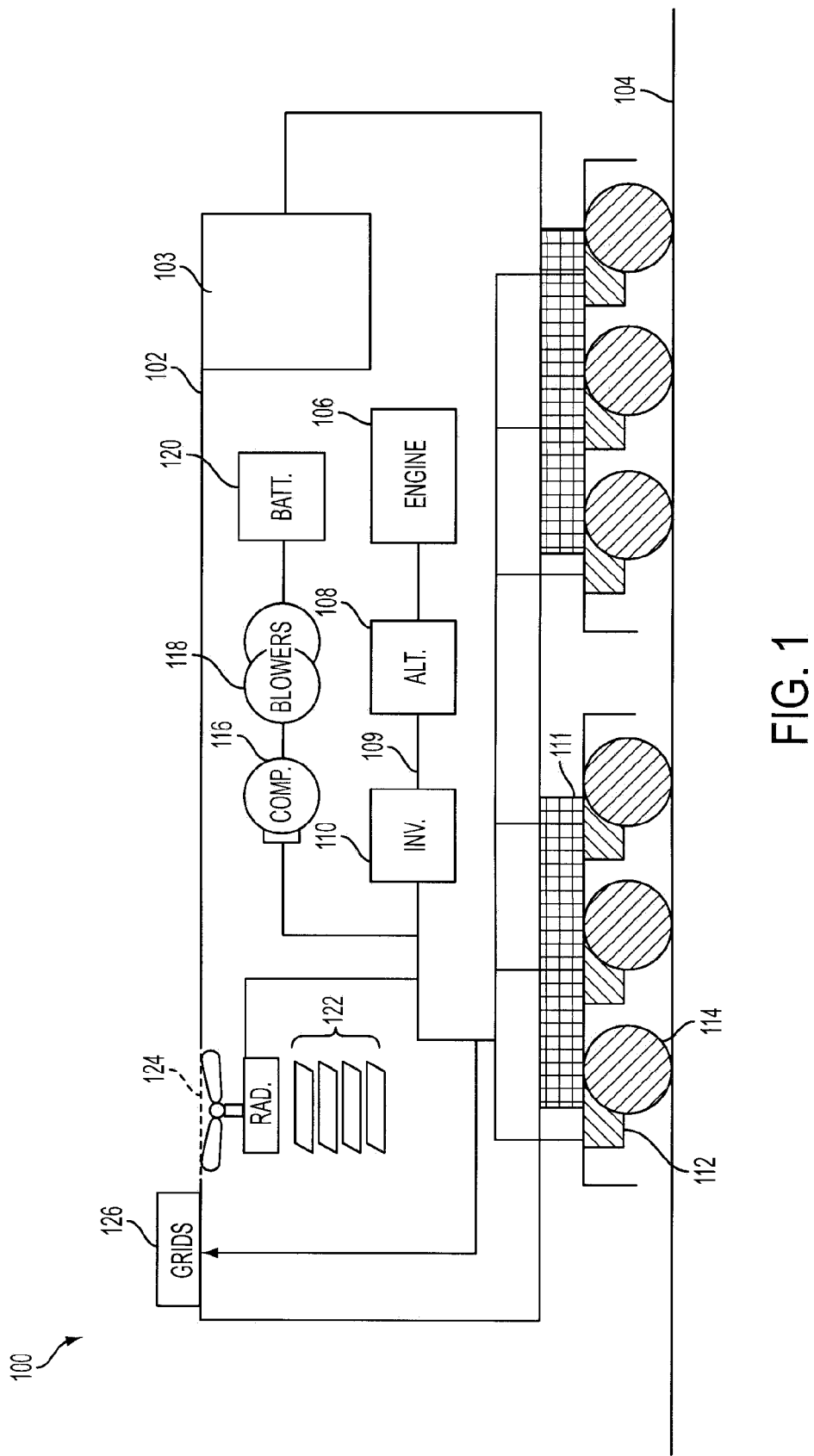
FIG. 1 shows an example embodiment of a diesel-electric locomotive.

FIG. 1 is a block diagram of an example locomotive vehicle system 100 (hereafter referred to as "locomotive 100"), configured to run on track 104. As depicted herein, in one example, the locomotive is a diesel electric vehicle operating a diesel engine 106 located within a main engine housing 102. However, in alternate embodiments of locomotive 100, alternate engine configurations may be employed, such as a gasoline engine or a bio diesel or natural gas engine, for example. Locomotive operating crew and electronic components involved in locomotive systems control and management may be housed within a locomotive cab 103.

The diesel engine generates a torque that is transmitted to an alternator 108 along a drive shaft (not shown). The generated torque is used by alternator 108 to generate electricity for subsequent propagation of the vehicle. Locomotive engine 106 may be run at a constant speed, thereby generating a constant horsepower (hp) output. It will be appreciated that the locomotive engine may also be run at variable speed and variable horse power, depending on operational demand. For example, in one embodiment, engine 106 may be configured to generate up to 4400 hp output. The electrical power generated in this manner may be referred to as the prime mover power. The electrical power may be transmitted along an electrical bus 109 to a variety of downstream electrical components. Based on the nature of the generated electrical output, the electrical bus may be a direct current (DC) bus (as depicted) or an alternating current (AC) bus. Auxiliary alternators generating smaller amounts of power (auxiliary power) for auxiliary components such as air conditioning, heating, etc, may be optionally provided in alternate embodiments of locomotive 100. The auxiliary power may be transmitted along an auxiliary bus. Alternatively, a common electrical bus may be used for the prime mover power and the auxiliary power.

Figure 2:
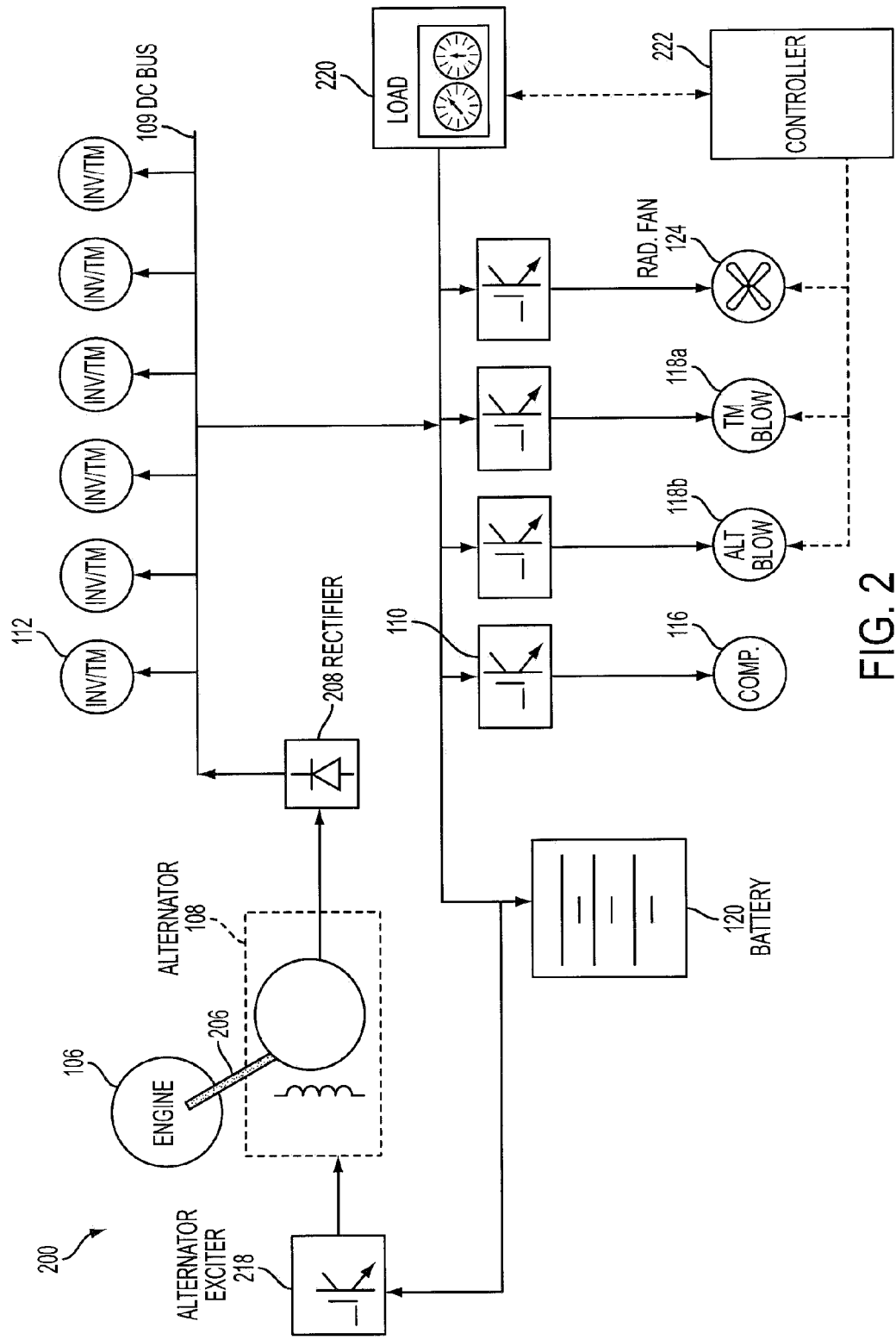
FIG. 2 shows an example map of the electrical architecture of the locomotive.

Alternator 108 may be connected in series to one, or more, rectifiers (FIG. 2) that convert the alternator's electrical output to DC electrical power prior to transmission along the DC bus 109. Based on the configuration of a downstream electrical component receiving power from the DC bus, an inverter may be used to convert the DC electrical power to AC electrical power. In one embodiment of locomotive 100, a single inverter 110 may supply AC electrical power from the DC electrical bus to a plurality of components. In an alternate embodiment, as depicted in FIG. 2, each of a plurality of distinct inverters may supply electrical power to a distinct component. It will be appreciated that in alternative embodiments, the locomotive may include one or more inverters connected to a switch that may be controlled to selectively provide electrical power to different components connected to the switch.

A traction motor 112, mounted on a truck 111 below the main engine housing 102, may receive electrical power from alternator 108 via DC bus 109 to provide tractive power to propel the locomotive. As described herein, traction motor 112 may be an AC motor. Accordingly, an inverter paired with the traction motor may convert the DC input to an appropriate AC input, such as a three-phase AC input, for subsequent use by the traction motor. In alternate embodiments, traction motor 112 may be a DC motor directly employing the output of the alternator after rectification and transmission along the DC bus. One example locomotive configuration includes one inverter/traction motor pair per wheel axle 114. As depicted herein, six inverter-traction motor pairs are shown for each of six axle-wheel pairs of the locomotive. In alternate embodiments, locomotive 100 may be configured with four inverter/traction motor pairs, for example.

Traction motor 112 may also be configured to act as a generator providing dynamic braking to brake locomotive 100. In particular, during dynamic braking, the traction motor may provide torque in a direction that is opposite from the rolling direction thereby generating electricity that is dissipated as heat by a grid of resistors 126 connected to the electrical bus. In one example, the grid includes stacks of resistive elements connected in series directly to the electrical bus. The stacks of resistive elements may be positioned proximate to the ceiling of main engine housing 102 in order to facilitate air cooling and heat dissipation from the grid.

Air brakes (not shown) making use of compressed air may be used by locomotive 100 as part of a vehicle braking system. The compressed air may be generated from intake air by compressor 116.

A multitude of electric machine driven airflow devices may be operated for temperature control of locomotive components. The airflow devices may include, but are not limited to, blowers, radiators, and fans. Each airflow device may be coupled to an electric machine such as a motor, which, when enabled, may convert a received electrical input into a rotational motion of the airflow device, thereby generating an active flow of air through the airflow device. It will be appreciated that in another aspect of the airflow device, the enabled motor may be operated as a generator wherein a rotational motion of the airflow device, as may be generated by a flow of air through the device, is converted to an electrical form of energy. Depicted herein, blowers 118 may be provided for the forced-air cooling of a number of electrical components. A traction motor blower 118a (FIG. 2) may blow cool air over traction motor 112 during periods of heavy work in order to regulate traction motor temperature. An alternator blower 118b (FIG. 2) may blow air to cool alternator 108. A grid blower (not shown) may blow air to cool the grid of resistors 126. Additional primary and auxiliary blowers may be configured to blow air to cool other primary and auxiliary electrical components. It will be appreciated that a plurality of blowers may be used in each blower configuration. Further, each blower may be driven by an AC or DC electric machine. As depicted herein, any of blowers 118 may be driven by an AC electric machine configured to receive electrical power from DC bus 109 by way of respective inverters (FIG. 2).

The engine temperature is maintained in part by a radiator 124. Water may be circulated around engine 106 to absorb excess heat and contain the temperature within a desired range for efficient engine operation. The heated water may then be passed through radiator 124 wherein air blown through the radiator fan cools the heated water. The flow of air through the radiator fan may be further adjusted with the help of louvers 122, vents (not shown), air ducts (not shown), or a combination thereof. The radiator fan may be located in a horizontal configuration proximate to the rear ceiling of locomotive 100 such that upon blade rotation, air may be sucked from below and exhausted. The radiator fan motor may be configured to receive electrical power from the DC bus 109 by way of a dedicated inverter (FIG. 2). A cooling system comprising a water-based coolant may optionally be used in conjunction with the radiator 124 to provide additional cooling of the engine.

A system electrical energy storage device 120, depicted as a battery in this example (and also referred to as "system battery 120"), may also be linked to DC bus 109. A DC-DC converter (not shown) may be configured between DC bus 109 and battery 120 to allow the high voltage of the DC bus (for example in the range of 1000V) to be stepped down appropriately for use by the battery (for example in the range of 12-75V). In the case of a hybrid locomotive, the on-board electrical energy storage device may be in the form of high voltage batteries, such that the placement of an intermediate DC-DC converter may not be necessitated. The battery may be charged by running engine 106. The electrical energy stored in the battery may be used during a stand-by mode of engine operation, or when the engine is shutdown, to operate various electronic components such as lights, on-board monitoring systems, microprocessors, processor displays, climate controls, and the like. Battery 120 may also be used to provide an initial charge to start-up engine 106 from a shutdown condition. In alternate embodiments, the electrical energy storage device 120 may be a super-capacitor, for example.

FIG. 2 illustrates an electrical architecture map 200 of the locomotive components introduced in FIG. 1. Diesel engine 106 is shown connected to alternator 108 via drive shaft 206. The AC electric power generated by the engine is rectified by rectifier 208 prior to transmission as DC electric power along DC bus 109 to downstream electrical components. Further, based on each component's electrical configuration, a dedicated inverter may be provided to convey AC power to the component from the DC bus. Accordingly, each traction motor may be depicted as a traction motor-inverter pair 112. As described previously, one traction motor-inverter pair may be provided for each axle of locomotive 100.

The diesel engine 106 provides the drive for the main alternator 108 which, in turn, provides the power for the traction motors 112. Thus, the power from the diesel engine is related to the power required by the traction motors. Consequently, if a larger amount of power is desired from the traction motors, a larger current may be drawn from the alternator, and accordingly the engine operates at a higher horsepower to generate the larger current. Therefore, the control of the diesel engine may be responsive to the power demands on the alternator. This interaction may be provided through an alternator exciter 218, which may vary the excitation of alternator 108 responsive to a power load being drawn such that the alternator output matches engine speed. Additionally, the exciter 218 may produce an initial current flow used by alternator 108 during alternator start-up conditions.

Other electrical components downstream of DC bus 109 may include, for example, compressor 116, radiator 124, traction motor blower(s) 118a, alternator blower(s) 118b, system battery 120, and load 220. As depicted, each component may receive power from the DC bus 109 via respective inverters 110, as needed.

Load 220 encompasses a range of electronic components involved in locomotive systems control and management, for example. These may be housed in locomotive cab 103, for example at a control desk, wherefrom a locomotive operating crew may read and infer a locomotive status. Electronic components comprising load 220 may include, but are not limited to, on-board monitoring systems, microprocessors, display systems, alarms, and lights. At any given point, an indication regarding the operational status of all components of locomotive 100 may be provided by this gamut of electronic controls. Since these components are involved in monitoring the status of locomotive 100, they may continue to operate, even during stand-by, shutdown, or other stationary conditions. Accordingly, even when the locomotive is in a stand-by mode of operation, and the engine has been shutdown, the load may continue to operate. In one example, the power requirement of load 220 may only be in the range of 1-2 hp. Thus, during a stand-by mode of operation, the power requirement of load 220 may be met by system battery 120. A DC-DC converter (not shown) may be configured between the system battery 120 and the load 220 to allow the higher voltage of the battery (for example in the range of 12-75V) to be appropriately stepped down for use by the control electronics of the electrical load 220 (for example to 5V, 12V, 24V, etc.)

It has been recognized by the inventors herein that during a stand-by mode of operation, for example when locomotive 100 is parked on a siding for a long term, ambient airflow (such as generated by ambient wind) through the stationary locomotive may rotate the blades of constituent airflow devices. Specifically, the natural movement of air currents through the radiator of a stationary locomotive may rotate the radiator fan blades at various speeds, depending on the direction of the wind, speed of the wind, etc. Even if the speed of rotation caused by the wind is less than the speed normally attained during active operation of the radiator, the motion may provide substantial energy to the system that may be harnessed to charge the battery and/or operate the load. For example, radiator 124 may have a power rating of 100 hp, but may rotate at 1/10th of the configured speed during a passive flow of wind through the radiator fan. A similar slower rotational motion of fan blades may also be passively generated by the flow of ambient air through the multitude of blower devices 118, for example the traction motor blowers 118a, and the alternator blowers 118b.

While in one embodiment, the ambient airstream is wind or another naturally occurring airflow, e.g., air that might pass over a locomotive or other vehicle while it is in a stationary and/or standby or idle mode, it will be appreciated that this is not meant as limiting. The ambient airstream may be any external airflow interacting with the vehicle, naturally occurring or not, such as might be created when the vehicle is in a moving state. Accordingly, in alternate embodiments, the ambient airstream may be a non-naturally occurring airflow. In one example, the locomotive may be coasting under gravity power. Herein, the locomotive engine may be in a stand-by mode of operation, however, the locomotive may not be in a stationary condition. As such, the passively generated non-natural airflow may be harnessed by the airflow devices of the locomotive to generate a substantial amount of electrical energy. In another example, the locomotive in a standby or idle mode may be part of a locomotive consist. Herein, a lead locomotive may pull a train while the second locomotive in a standby state may harness the energy of the non-natural ambient airflow by generating electrical energy at the electric machine of the blowers/fans. Further still, the ambient airstream may be harnessed during motion in the case of engine/alternator failure.

A controller 222 may be configured to monitor the flow of ambient air through the fans and blowers, and appropriately harness the kinetic energy by utilizing the respective airflow device electric machines as a generator to generate electrical power. Controller 222 may include one or more of a plurality of networked or otherwise integrated controllers. In one embodiment, controller 222 may be configured to monitor the rotational speed of fan blades in at least one airflow device when the locomotive is in a stand-by mode. In alternate embodiments, a wind sensor may provide an indication of wind speed and/or direction to controller 222. If the flow of natural air currents through the fans and blowers generates a rotational speed greater than a desired minimum threshold, the controller may perform a stand-by charging routine, as further elaborated in FIG. 3. Specifically, when at least a minimum rotational speed is attained, controller 222 may operate the electric machine coupled to the airflow device as a generator to harness the rotational energy and employ it to trickle charge the system battery 120 and/or power a load. A louver adjustment, as detailed in FIG. 4, may be applied to channel the natural flow of air through the airflow device and consequently enhance the amount of energy that can be harnessed.

The electrical power generated in this manner may only be a fraction of the power generated under engine running conditions. For example, under running conditions, locomotive 100 may generate power in the order of 4000 hp versus 1-2 hp that may be generated by harnessing the wind flow. Consequently, it may not be desirable to harness the energy of the air flowing through the fans and blowers under engine running conditions. During a stand-by mode of operation, however, power is primarily consumed by the electronic control components of load 220. This lower power requirement may normally be met by the system battery 120. By trickle charging battery 120 through the harnessing of natural air flowing through locomotive 100's constituent fans and blowers, the rate of battery discharge may be reduced. Consequently, the frequency with which system battery 120 would need to be recharged by running engine 106 may be reduced. In this way, by reducing the recurrence rate of engine start-up and shutdown procedures, the power requirement of load 220 may be met without adversely affecting engine performance.

Figure 3:
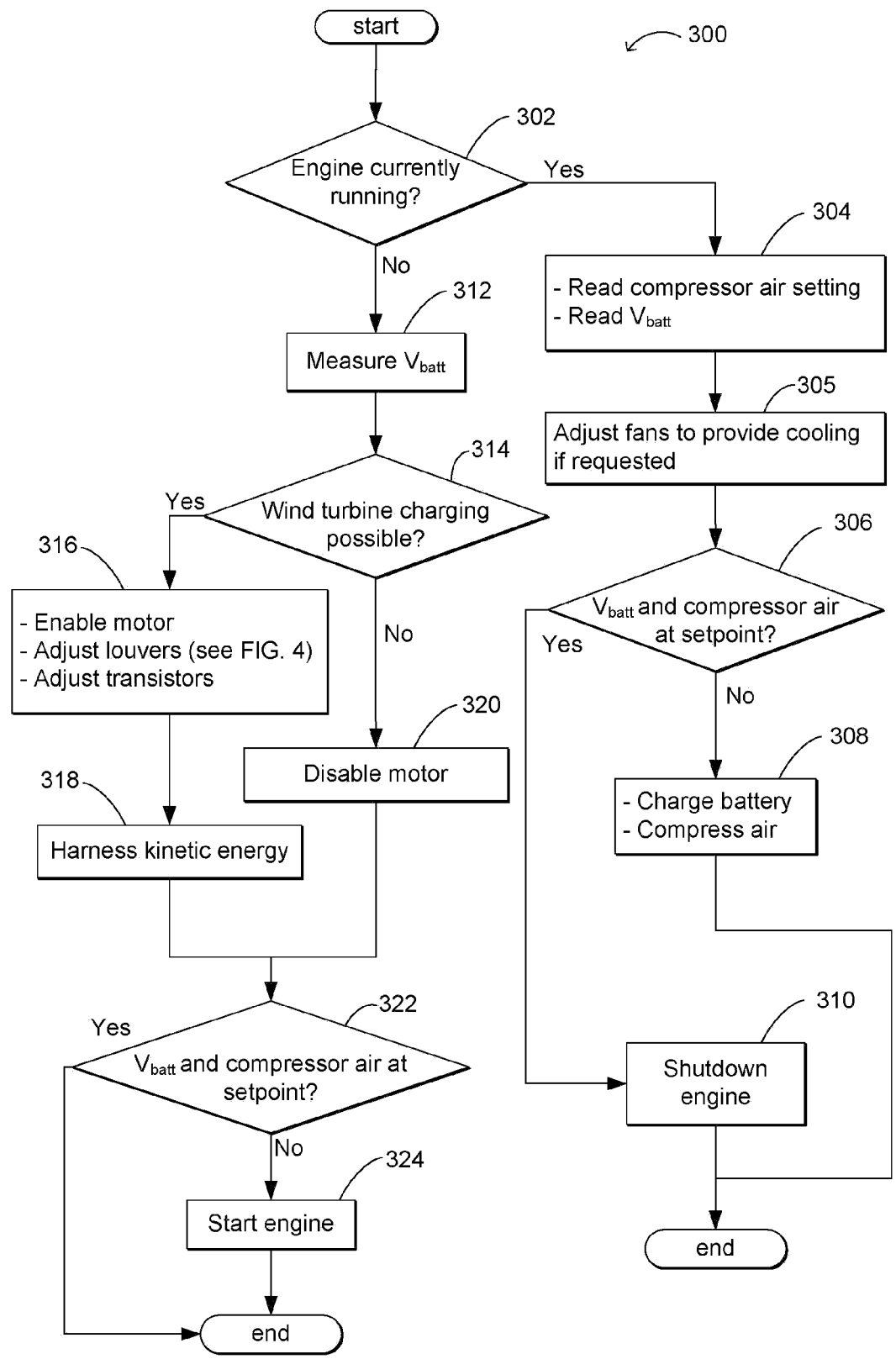
FIG. 3 shows a high level flow chart for engine running and battery charging operations, for a locomotive in stand-by mode of operation, according to the present disclosure.

FIG. 3 depicts a stand-by routine 300, comprising a multiple of sub-routines that may be performed by controller 222 during a stand-by operation mode of locomotive 100. These may occur when the locomotive is in a stationary mode, for example when parked on a siding for a long term. In another example, locomotive 100 may be shifted to a stand-by mode after 4000 hours of engine operation. It will be appreciated that the operations elaborated in routine 300 may be performed when no other demand is made from the engine as may be required during propulsion or a locomotive ready mode.

At 302, it is first verified if the engine is currently running. If at 302 the engine is found to be running, then at 304, the compressor air settings and battery voltage settings (Vbatt) are read. At 305, the fans and blowers may be adjusted to provide cooling to respective locomotive components, if requested. At 306, the read setting values are compared to respective set points. If the values are at or above their respective desired levels, then the subroutine proceeds to shutdown the engine at 310. That is, if the compressor is sufficiently full of compressed air and a compressed air storage pressure has been reached, and further if the battery is fully charged, the engine may be shutdown. It will be appreciated that in alternate embodiments of routine 300, additional ambient condition assessments, such as whether ambient temperatures are above a minimum shutdown temperature, may be incorporated at 304. In the event that either, or both, desired set points have not been attained at 306, then at 308, the compressor 116 intake air is compressed and/or the battery 120 is charged from the DC bus using the electrical power generated from running the engine. In one example, engine 106 may be run for 1-2 hours to sufficiently charge battery 120.

Returning to 302, if it is determined that the engine is not currently running, at 312 the system battery voltage or state of charge or load on the battery is estimated and at 314, the controller 222 assesses if wind turbine charging is possible. In one aspect of routine 300, controller 222 may monitor the blade rotation speed of the fans and/or blowers while their respective motors are not active/disabled. This may be achieved with a sensor coupled to the shaft of the airflow device and/or motor that may monitor rotation related parameters such as speed or position, periodic power regeneration attempts, or a combination thereof. In one example, the controller may allow the motor to be transiently enabled while the sensor estimates if under the current conditions of ambient air flow, a minimum amount of power can be generated. If so, the controller may assess that wind turbine charging conditions are prevalent. In another example, if the estimated rotation speed of at least one of the fans and blowers is above a desired minimum threshold value, then the controller may assess that wind turbine charging conditions are prevalent. If a minimum threshold value of rotation speed of power generation has not been attained, then the controller 222 may assess that wind turbine charging is not possible, and at 320, disable the airflow device motor, or maintain the motor in an inactive state.

If at 314, it is estimated that wind turbine charging is possible, then at 316, controller 222 may first enable an electric machine coupled to the airflow device(s), such as enabling the motor coupled to a radiator fan, to be operated as a generator. The electric machine may be enabled and operated responsive to the monitored rotation of the airflow device. For example, the radiator motor may be enabled only when a minimum rotation speed threshold has been crossed. Following enablement, the routine may perform a louver adjustment protocol (as further elaborated in FIG. 4) to enhance the flow of air through the wind charging enabled airflow device(s) identified at 314. Additionally, the transistors (and other related electronic components) of the respective airflow device(s) may be adjusted in order to allow their motor to operate as a generator (and to harness the kinetic energy of air flowing through the device by converting the kinetic energy to electrical energy). In alternative embodiments, airflow through the device may be enhanced with the additional use of air ducts, vents, or another appropriate airflow control device. By channeling the flow of air through the fans and blowers with louvers, and further by adjusting the fan and/or blower motors to allow electrical energy to be generated from the kinetic energy of the rotating fan and/or blower blades, at 318, the kinetic energy may be harnessed.

Figure 4:
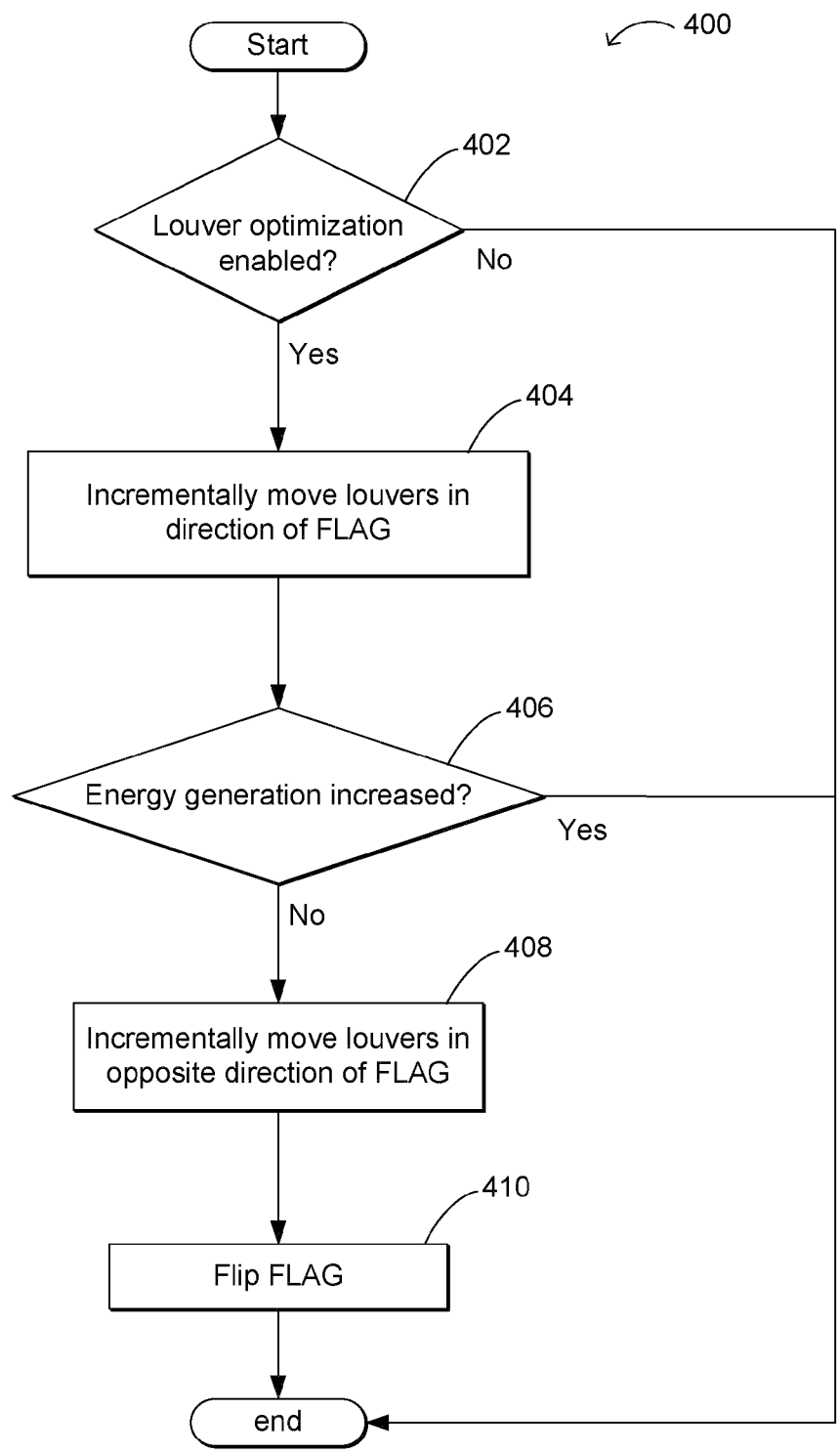
FIG. 4 shows a high level flow chart for louver adjustments as may be performed in the stand-by routine of FIG. 3.

As further elaborated in FIG. 4, the airflow control device settings may be adjusted responsive to the harnessed energy generated by the motors. The harnessed energy may then be transmitted along DC bus 109 and used to charge battery 120 and/or power one or more loads. For example, the harnessed energy may be an electric current generated by the airflow device's electric machine that is transmitted along the DC bus. In an alternate embodiment, a portion of the harnessed energy may be used to charge system battery 120 while a remaining portion may be stored in an alternate electrical energy storage device, such as a super-capacitor. In yet another embodiment, the fan and/or blower motor settings may be appropriately adjusted such that the amount of energy harnessed may be accordingly regulated. Further, in another embodiment, the fan and/or blower motor settings may be adjusted such that in lieu of harnessing the kinetic energy for purposes of energy storage, the rotation of the fans and blowers may be used to provide cooling power to devices that may be able to use it. For example wind-generated energy harnessed by a first blower/fan may be used to power a second blower/fan.

Thus, the wind energy may be harnessed and the system battery may be charged when the engine is shutdown. The charged system battery may then be used to supply electrical power to the controller 222 to operate the electronic components of load 220 during stationary conditions of locomotive 100 operation. By ensuring that the fan and/or blower motor is not enabled constitutively, but responsive to a minimum blade rotation speed, the controller can reduce electrical power consumed in operating the airflow device motor in the generator mode, when little or no energy is harnessed.

At 322, the system battery voltage and compressor air settings are again monitored and compared to the setpoints. If the system battery is sufficiently charged, and the compressor is sufficiently full of air and/or no further air is required, then the routine may end with the engine remaining shutdown. If however, the battery has been sufficiently drained, for example due to insufficient charging or due to a sufficiently loaded operation, then at 324, the engine may be started, responsive to the system battery voltage, in order to charge system battery 120. Additionally, or alternately, if the compressor air pressure is below the desired setpoint, the engine may be restarted and used to fill the compressor with a sufficient amount of air. In this way, system battery discharging may be reduced by harnessing wind energy interacting with the locomotive, thereby reducing a number of engine starts and/or reducing a duration of engine operation, during the stand-by mode.

FIG. 4 describes additional details of a louver adjustment routine 400 that may be carried out at 316 of the locomotive stand-by routine 300. Herein, louvers 122 may be adjusted based on a peak detection algorithm such that natural airflow through the fans of radiator 124 and blowers 118 is enhanced and an increased amount of wind energy is harnessed. Accordingly, first at 402, a louver optimization enablement is verified. That is, the controller confirms that the conditions are appropriate for adjusting the louvers. In one embodiment, this may include an estimation of a wind speed by monitoring the rotation speed of at least one of the fans and/or blowers. If the speed is above a desired minimum threshold value, then the controller 222 may assess that wind turbine charging is possible and hence louver optimization may be enabled to increase the amount of energy that can be harnessed. In alternate embodiments, wind speed and direction may be assessed. On the other hand, if a minimum threshold value has not been attained at 402, then the controller may assess that a subsequent louver adjustment, fan/blower motor operation, and wind based electricity generation, may not be sufficiently effective, and may end the routine.

If at 402, louver optimization is enabled, controller 222 may read a flag marker (FLAG) indicative of a direction of louver adjustment. Upon initialization, the flag may be set to a default direction, such as in a direction of increased opening. Accordingly, at 404, the louvers may be incrementally moved in the direction of the current value of the flag. Then, at 406, the effect of the louver adjustment may be checked by measuring a change in wind harnessed electrical energy generation. In one embodiment, an estimation of an electric current generated may be used to determine a change in energy generation. If louver adjustments in the default flag direction enhance wind flow through the fans/blowers, a larger amount of kinetic energy may be harnessed, and consequently a larger electrical current may be generated. Further, during the next iteration of the routine, the louvers will again be moved in the same direction to determine whether harnessed energy continues to increase. On the contrary, if at 406, the amount of energy generated has not increased, then at 408 the louvers may be incrementally moved in the opposite direction during the next iteration and the flag setting may be flipped at 410 to the opposite direction. Alternatively, the louvers may be adjusted to a predetermined optimum position based on the ambient conditions. In this manner, by adjusting louver direction and aperture responsive to an electrical current generated upon air flow through the fans and blowers, the wind energy harnessing ability of the fans and blowers may be enhanced. In doing so, discharge of the system battery may be more effectively reduced. Additionally, various other peak detection algorithms may be used.

Figure 5:
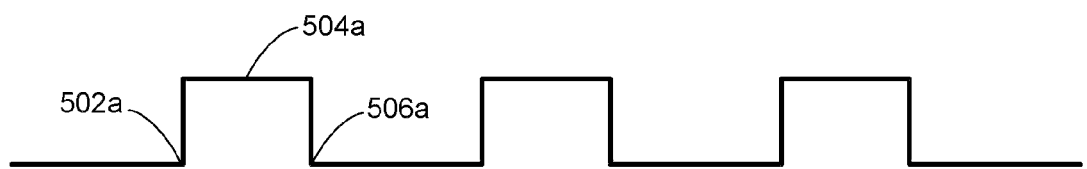
FIG. 5 shows example pulse trains illustrating differences in engine operation duty cycles based on a battery charging route selected in FIG. 3.
Figure 5:
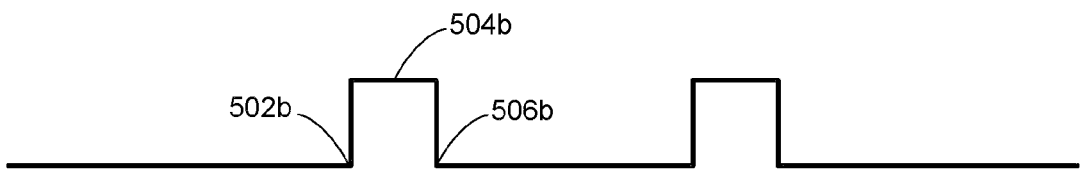

FIG. 5 depicts example pulse trains of engine 106 operation, altering between a start mode and a shutdown mode, in the absence (500*a*) or presence (500*b*) of additional wind-based charging. In pulse train 500*a*, a time interval of engine operation is depicted along the x-axis. The duty cycle begins at time point 502*a* with the engine being started. The engine is run for a period depicted by 504*a* during which the electrical energy generated by engine operation may be used to charge system battery 120. Upon completion of charging, the engine may be shutdown at 506*a*. As illustrated, over the depicted duration of engine operation, the engine runs through 3 cycles of being started up and shutdown.

In pulse train 500*b*, engine duty cycles over the same duration of engine operation are shown, with the added incorporation of wind harnessed energy generation, as explained previously in FIGS. 3-4. By delivering energy to the system battery using electrical power generated by ambient airflow through the engine blowers and/or fans of the stationary locomotive, the frequency and length of each duty cycle may be reduced. Accordingly, an engine start up may be delayed to time point 502*b* and/or run for a shorter period of time depicted by 504*b*, before being shutdown at 506*b*. It will be appreciated that if no residual charge, or a negligible residual charge, is left in battery 120 at time point 502*b* from the trickle charging, then engine 106 may optionally be run for a period of time 504*b* equal to 504*a*, before being shutdown at 506*b*. In contrast to pulse train 500*a*, over an identical duration of engine operation in pulse train 500*b*, the engine runs through 2 shorter cycles of engine start-up and shutdown. In this manner, by harnessing a natural flow of air through a locomotive's airflow devices, the incidence of complete system battery discharge may be reduced, thereby reducing the frequency with which the engine may require starting, when in a stand-by mode of operation. In doing so, engine performance degradation and component malfunction possibilities, that may be associated with frequent recurrence of engine start-up and shutdown, may be reduced.

Figure 6:
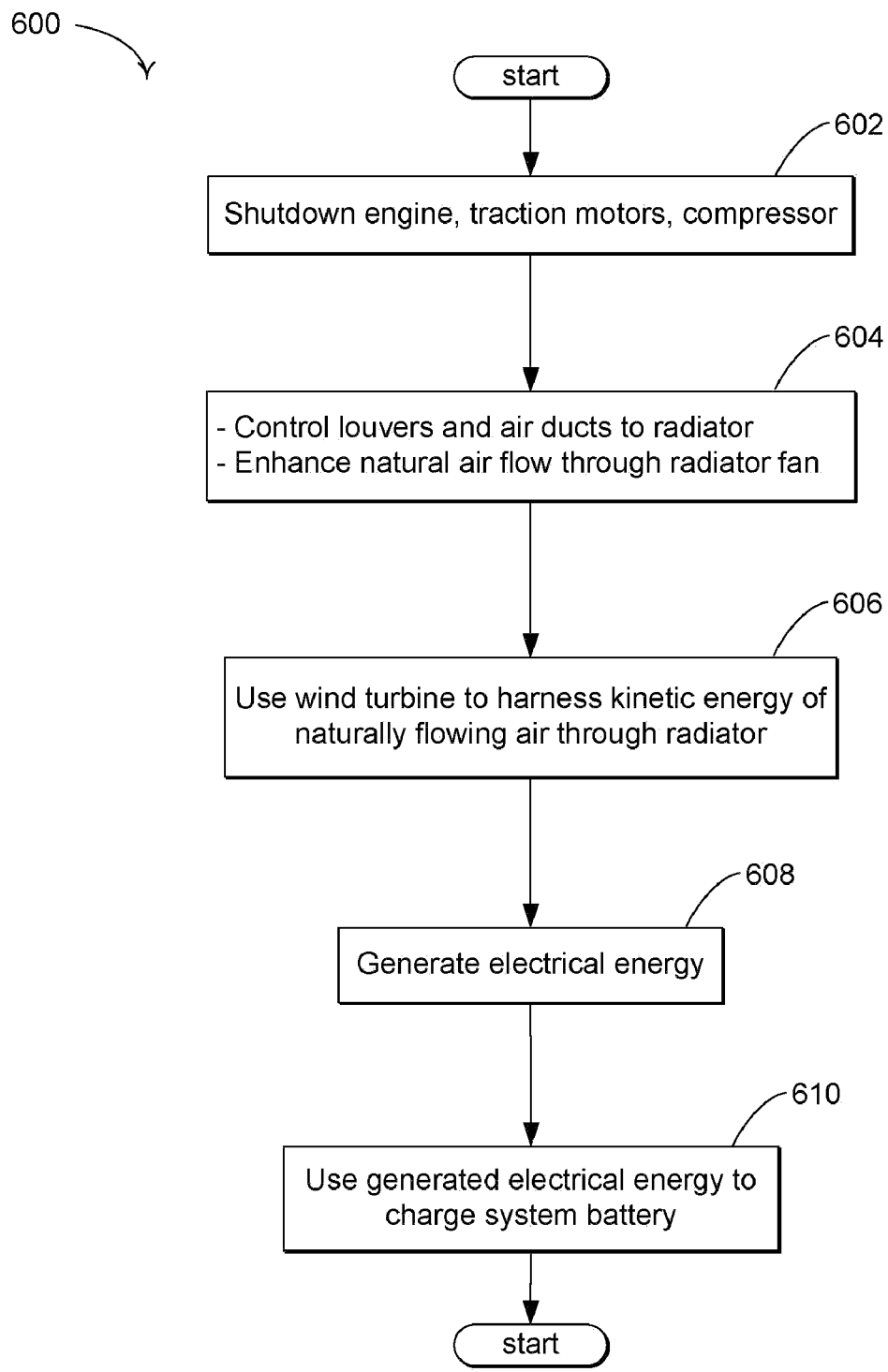
FIG. 6 shows a high level flow chart for battery charging procedures according to the present disclosure.

Referring now to FIG. 6, it shows a high-level process flow illustrating example operation for harnessing ambient airflow energy interacting with the locomotive. Specifically, FIG. 6 shows a battery charging approach performed by controller 222 once it has been ascertained that the conditions, as described previously, are appropriate for wind based charging of the system battery. Accordingly, at 602, the engine, traction motors, and compressor may be shutdown. At 604, the louvers, air ducts, and vents may be adjusted such that an increased amount of ambient air may be channeled through the air flow device, herein exemplified by the radiator 124. The enhanced flow of air through the radiator fan may result in an enhanced rotation of radiator fan blades. The augmented kinetic energy may then be harnessed by a wind turbine, for example the appropriately enabled motor of radiator 124, at 608 and used to generate electrical energy. At 610, this electrical energy may then be used to charge system battery 120. The charged battery may then be used to power constitutively operating load 220 without the need for running engine 106. It will be appreciated that in alternate embodiments, only a fraction of the electrical energy generated may be used to charge the system battery while the remaining portion may be stored in an alternative electrical energy storage device, or converted to an alternate form of energy, such as mechanical energy. Similarly, the harnessed energy may be delivered to the system to power operating loads.

In this way, use of wind energy harnessed from ambient air flow may reduce engine-operation-based battery charging of the locomotive battery in order to supply power to electronic components such as lights, displays, microprocessors, and equipment involved in locomotive control and management. Such operation may thereby improve fuel economy and reduce engine and/or starting system wear.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of generating electrical energy in a vehicle having at least one airflow device coupled to an electric machine, the method comprising:

during a first condition, generating electrical energy at the electric machine, said electric machine being driven by an ambient airflow interacting with the airflow device; and during a second condition, receiving electrical input at the electric machine and converting the electrical input into motion of the airflow device to generate a cooling airflow for at least a vehicle component; and delivering at least some of the generated energy to at least an electrical component of the vehicle.

2. The method of claim 1 wherein the method further comprises generating electrical energy at the electric machine during at least a stationary condition of the vehicle.

3. The method of claim 1 wherein generating electrical energy at the electric machine further comprises operating the electric machine to harness kinetic energy from a motion of the airflow device, the motion generated by the ambient airflow interacting with the airflow device.

4. The method of claim 2 wherein said vehicle is a locomotive, and where the stationary conditions include a stand-by mode of the locomotive where an engine of the locomotive is shut-down.

5. The method of claim 1 where said airflow device is a blower.

6. The method of claim 4 where said airflow device is a radiator fan, and where the harnessed energy is delivered to operate an electrical load of the locomotive during the stationary conditions.

7. The method of claim 3 where said harnessed energy is an electric current generated by the electric machine, and where the harnessed energy charges a battery.

8. The method of claim 4 further comprising:
during the first condition, a controller starting the engine responsive to a system battery charge indication; and
shutting down the engine when the system battery charge has reached a desired level.

9. A method of charging a system electrical energy storage device in a vehicle having at least one airflow device coupled to an electric machine, the method comprising:
during at least stationary conditions of the vehicle:
operating the electric machine to harness kinetic energy from motion of the airflow device, the motion generated by an ambient airflow; and
charging the system electrical energy storage device with at least some of the harnessed energy;
wherein said vehicle is a locomotive, and where the stationary conditions include a stand-by mode of the locomotive where an engine of the locomotive is shutdown;
wherein said system electrical energy storage device is a battery; and
wherein said airflow device is a blower or a radiator fan.

10. The method of claim 9 where said harnessed energy is an electric current generated by the electric machine.

11. The method of claim 9 further comprising:
starting the engine responsive to a system battery charge indication; and
shutting down the engine when the system battery charge has reached a desired level.

12. The method of claim 11 further comprising selectively charging the battery when the engine is shutdown.

13. The method of claim 12 further comprising supplying an electrical power to a controller during the stationary conditions.

14. The method of claim 9 further comprising adjusting an air flow control device responsive to the harnessed energy generated by the electric machine.

15. The method of claim 9 further comprising operating the electric machine responsive to a monitored rotation of the airflow device.

16. The method of claim 9 further comprising adjusting a setting of the air flow device to adjust an amount of energy harnessed.

17. A system for a locomotive, comprising:
a battery;
an electrical load;
an airflow device coupled to an electric machine;
louvers;
an engine; and
a controller configured to, during at least stationary conditions of the locomotive where the engine is shut down,
operate the electric machine to harness kinetic energy from motion of the airflow device, the motion generated by an ambient airflow;
charge the battery with at least some of the harnessed energy, where the battery supplies energy to operate the electrical load during the stationary conditions; and
adjust the louvers responsive to the motion of the airflow device.

18. The method of claim 1, wherein the first condition includes a stationary condition of the vehicle, and wherein the second condition includes a moving condition of the vehicle.

19. The method of claim 18, wherein the vehicle is a locomotive, and wherein the motion of the airflow device includes a rotational motion of the airflow device.

20. The method of claim 19, wherein the second condition further includes temperature control of a locomotive component.

21. The method of claim 1, wherein the vehicle is a locomotive, and the first condition includes a stand-by mode of engine operation with the locomotive either stationary or moving.

* * * * *